(12) United States Patent
Ewart et al.

(10) Patent No.: US 12,492,274 B2
(45) Date of Patent: Dec. 9, 2025

(54) ANTIFOULANT AND PROCESS

(71) Applicant: Dow Global Technologies LLC, Midland, MI (US)

(72) Inventors: Sean W. Ewart, Pearland, TX (US); Sarat Munjal, Lake Jackson, TX (US); Alexandra E. Frankel, Lake Jackson, TX (US); Henk Hagen, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 698 days.

(21) Appl. No.: 17/914,623

(22) PCT Filed: Mar. 26, 2021

(86) PCT No.: PCT/US2021/024325
§ 371 (c)(1),
(2) Date: Sep. 26, 2022

(87) PCT Pub. No.: WO2021/202273
PCT Pub. Date: Oct. 7, 2021

(65) Prior Publication Data
US 2023/0121509 A1  Apr. 20, 2023

Related U.S. Application Data

(60) Provisional application No. 63/002,474, filed on Mar. 31, 2020.

(51) Int. Cl.
*C08F 10/02* (2006.01)
*C08F 2/00* (2006.01)
(Continued)

(52) U.S. Cl.
CPC ............ *C08F 210/02* (2013.01); *C08F 2/005* (2013.01); *B01J 19/002* (2013.01); *C08F 10/02* (2013.01); *C08F 2400/04* (2021.01)

(58) Field of Classification Search
None
See application file for complete search history.

(56) References Cited

U.S. PATENT DOCUMENTS 5,872,252 A * 2/1999 Sutoris .................... C08F 10/00
                                                          526/204
5,914,379 A   6/1999 Sutoris et al.
(Continued)

FOREIGN PATENT DOCUMENTS

EP       2589612 A1 * 5/2013  ............. C08F 10/00
JP   2007-063237 A    3/2007
(Continued)

OTHER PUBLICATIONS

Si Tian-Bao, et al, "Analysis of Fouling in Super Compressor and Intercooler During Production of Low Density Polyethylene," Shenhua Technology, Jan. 26, 2015, p. 82, vol. 1.

*Primary Examiner* — Richard A. Huhn
(74) *Attorney, Agent, or Firm* — Boyle Fredrickson S.C.

(57) ABSTRACT

The present disclosure provides a process. In an embodiment, the process includes introducing an antifoulant into an ethylene feed of a reactor system. The reactor system includes the ethylene feed, a hyper-compressor, a preheater and a polymerization reactor. The ethylene feed is located upstream of the hyper-compressor. The antifoulant consists of an inhibitor, molecular oxygen, and optionally a solvent. As the ethylene feed is located upstream of the hyper-compressor, the process includes introducing the antifoulant into the ethylene feed upstream of the hyper-compressor. The process further includes adding a free radical initiator to the polymerization reactor. The process further includes polymerizing the ethylene in the polymerization reactor under high pressure free-radical polymerization conditions, and forming an ethylene-based polymer.

6 Claims, 2 Drawing Sheets

Experimental Setup

(51) Int. Cl.
   *C08F 210/02*   (2006.01)
   *B01J 19/00*   (2006.01)

(56) References Cited

U.S. PATENT DOCUMENTS

| | | |
|---|---|---|
| 6,172,014 B1 | 1/2001 | Meyers |
| 6,562,915 B2 | 5/2003 | Mähling et al. |
| 9,109,064 B2 | 8/2015 | Hjertberg et al. |
| 9,243,082 B2 | 1/2016 | Berhalter et al. |
| 10,144,898 B2 | 12/2018 | Gutermuth et al. |
| 10,457,757 B2 | 10/2019 | Eddy et al. |
| 2003/0008982 A1* | 1/2003 | Mahling ............... C08F 110/02 526/82 |
| 2014/0288248 A1 | 9/2014 | Berthalter et al. |
| 2015/0031843 A1* | 1/2015 | Hjertberg ............... C08F 210/02 526/74 |
| 2018/0290120 A1 | 10/2018 | Lammens et al. |

FOREIGN PATENT DOCUMENTS

| | | | | |
|---|---|---|---|---|
| JP | 2010059414 A * | 3/2010 | ............. | C08F 10/00 |
| WO | 98/20045 A1 | 5/1998 | | |

* cited by examiner

FIG. 1
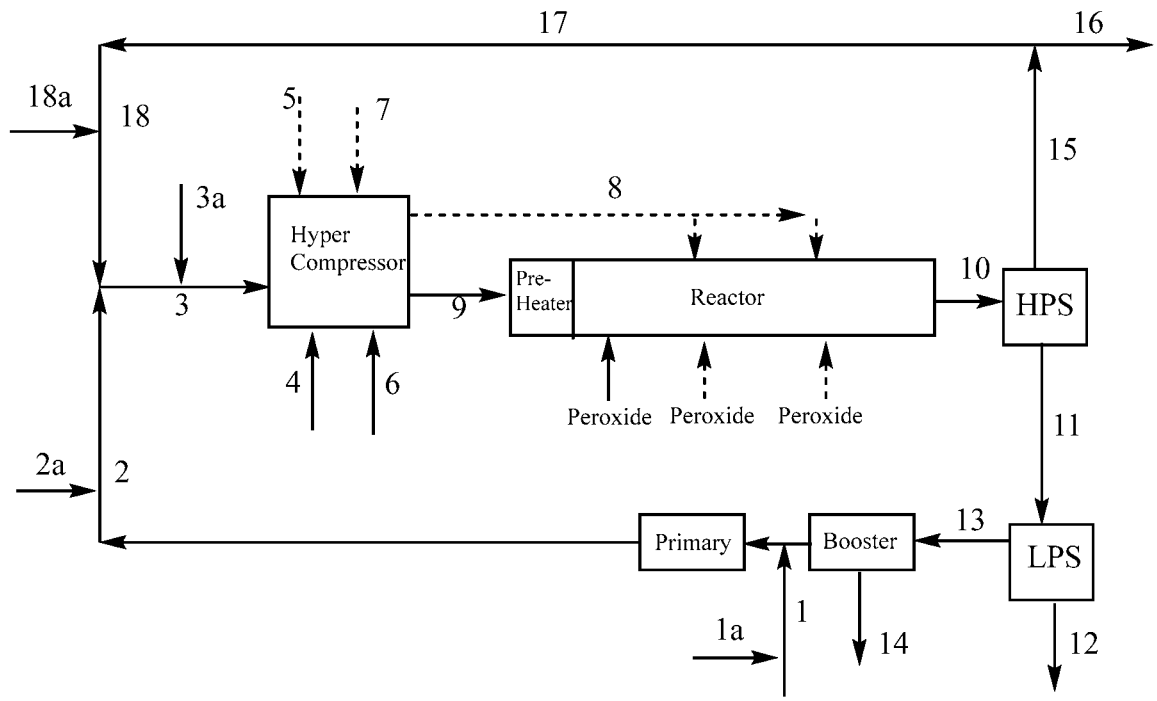
Fig 2: Experimental Setup
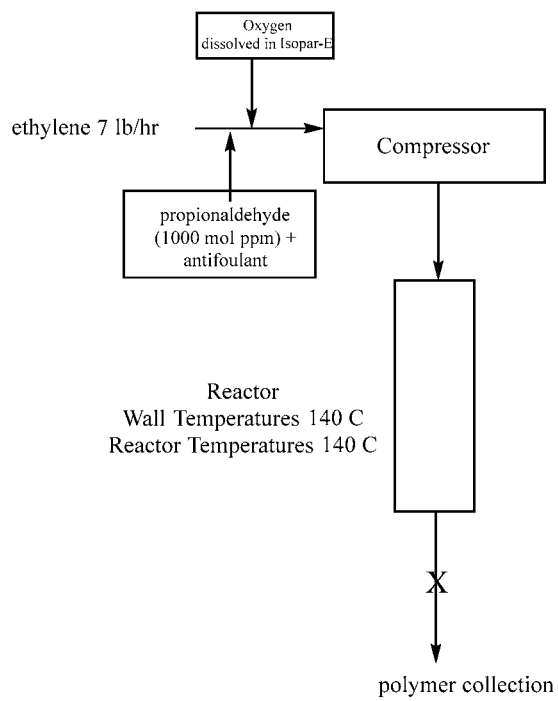

FIG. 3
Comp. Example #1
no inhibitor
0.55 lbs Poly collected
FIG. 4
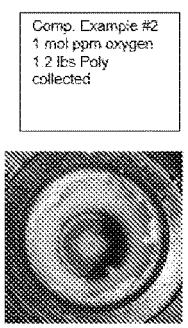
Comp. Example #2
1 mol ppm oxygen
1.2 lbs Poly collected
FIG. 5
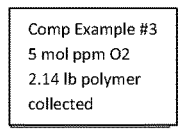
Comp Example #3
5 mol ppm O2
2.14 lb polymer collected
FIG. 6
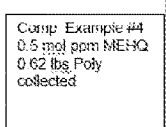
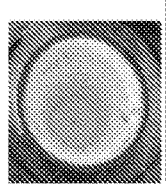
Comp. Example #4
0.5 mol ppm MEHQ
0.62 lbs Poly collected
FIG. 7
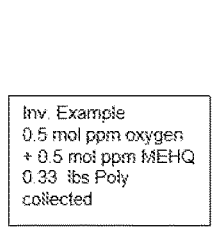
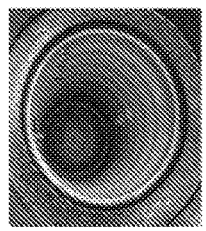
Inv. Example
0.5 mol ppm oxygen
+ 0.5 mol ppm MEHQ
0.33 lbs Poly collected

ANTIFOULANT AND PROCESS

BACKGROUND

A significant obstacle facing industrial-scale low density polyethylene (LDPE) production is the fouling that occurs within the reactor system. Pre-polymerization of ethylene that occurs upstream of the polymerization reactor results in pre-polymer buildup on compressor parts and pre-polymer caking on the inner walls of tubing and piping located upstream of the polymerization reactor. This buildup of pre-polymer on system components is detrimental to LDPE production because it leads to reduced production rates and leads to reactor downtime for the removal of the buildup.

Conventional LDPE production systems typically add foulant inhibitor into the oil used to lubricate the hyper-compressor plunger. This approach is problematic. When the inhibitor is incorporated into the lubricant oil, it is difficult to control and manage the amount of inhibitor that actually reaches the areas where pre-polymerization occurs. The art therefore recognizes the need for improved processes for the reduction, and prevention, of pre-polymerization fouling in LDPE production.

SUMMARY

The present disclosure provides a process. In an embodiment, the process includes introducing an antifoulant into an ethylene feed of a reactor system. The reactor system includes the ethylene feed, a hyper-compressor, a preheater and a polymerization reactor. The ethylene feed is located upstream of the hyper-compressor. The antifoulant consists of an inhibitor, molecular oxygen, and optionally a solvent. As the ethylene feed is located upstream of the hyper-compressor, the process includes introducing the antifoulant into the ethylene feed upstream of the hyper-compressor. The process further includes adding a free radical initiator to the polymerization reactor. The process further includes polymerizing the ethylene in the polymerization reactor under high pressure free-radical polymerization conditions, and forming an ethylene-based polymer.

BRIEF DESCRIPTION OF THE DRAWINGS

FIG. 1 is a schematic representation of a flow scheme for a reactor system in accordance with an embodiment of the present disclosure.

FIG. 2 is a schematic representation of the equipment used to replicate the operating conditions for the hyper-compressor and preheater in a large-scale industrial LDPE reactor system and, the equipment in FIG. 2 used to generate the comparative examples and the inventive example.

FIG. 3 shows two photographs of the level of fouling for comparative sample 1.

FIG. 4 shows two photographs of the level of fouling for comparative sample 2.

FIG. 5 shows two photographs of the level of fouling for comparative sample 3.

FIG. 6 shows two photographs of the level of fouling for comparative sample 4.

FIG. 7 shows two photographs of the level of fouling for inventive example 1.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure).

The numerical ranges disclosed herein include all values from, and including, the lower and upper value. For ranges containing explicit values (e.g., from 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, or customary in the art, all parts and percentages are based on weight and all test methods are current as of the filing date of this disclosure.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "ethylene-based polymer," as used herein, refers to a polymer that includes, in polymerized form, more than 50 wt %, or a majority amount, of ethylene, based on the weight of the polymer, and, optionally, may include at least one comonomer or other molecule.

The term "ethylene monomer," as used herein, refers to a chemical unit having two carbon atoms with a double bond therebetween, and each carbon bonded to two hydrogen atoms, wherein the chemical unit polymerizes with other such chemical units to form an ethylene-based polymer composition.

The term "fouling" refers to the deposition (temporary or permanent) of a pre-polymer layer (or a polymer layer) onto the surface of a component in a polymerization reactor system or other apparatus used in a polymerization reactor system (such as an LDPE reactor system, for example). A layer of pre-polymer (or polymer) of this nature in the hyper-compressor (or on the check valves of the hyper-compressor) can negatively affect the total ethylene throughput into the reactor. A layer of pre-polymer (or polymer) of this nature in the preheater or in the polymerization reactor can impact the overall heat transfer coefficient in one or more components of the reactor system used to produce LDPE, thus reducing the production rate of the polymer.

The term "hydrocarbon-based molecule," as used herein, refers to a chemical component that has only carbon atoms and hydrogen atoms.

The term "low density polyethylene," (or LDPE) as used herein, refers to an ethylene-based polymer having a density from 0.909 g/cc to less than 0.940 g/cc, or from 0.917 g/cc to 0.930 g/cc, and long chain branches with a broad molecular weight distribution (MWD greater than 3.0). LDPE is distinct from linear low density polyethylene. The term "linear low density polyethylene," (or "LLDPE") as used herein, refers to a linear ethylene/α-olefin copolymer containing heterogeneous short-chain branching distribution comprising units derived from ethylene and units derived from at least one $C_3$-$C_{10}$ α-olefin, or $C_4$-$C_8$ α-olefin comonomer. LLDPE is characterized by little, if any, long chain branching, in contrast to conventional LDPE which has long chain branching. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

The term "molecular oxygen" as used herein, refers to a diatomic molecule that consists of two oxygen atoms covalently bonded to each other. Molecular oxygen is interchangeably referred to as elemental oxygen, or $O_2$. Nonlimiting examples of sources for molecular oxygen include air (~21 vol % molecular oxygen), $O_2$ gas, liquid $O_2$, and blends of $O_2$ in other inert gases such as nitrogen, $N_2$, for example. Oxygen may be added as a gas stream or pre-dissolved in a solvent.

The term "polymer" or a "polymeric material," as used herein, refers to a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

Density is measured in accordance with ASTM D792, Method B. Results are reported in grams per cubic centimeter (g/cc).

Melt Index

The term "melt index," or "MI" as used herein, refers to the measure of how easily a thermoplastic polymer flows when in a melted state. Melt index, or $I_2$, is measured in accordance by ASTM D 1238, Condition 190° C./2.16 kg, and is reported in grams eluted per 10 minutes (g/10 min). The I10 is measured in accordance with ASTM D 1238, Condition 190° C./10 kg, and is reported in grams eluted per 10 minutes (g/10 min).

DETAILED DESCRIPTION

The present disclosure provides a process. In an embodiment, the process includes introducing an antifoulant into an ethylene feed of a reactor system. The reactor system includes the ethylene feed, a hyper-compressor, a preheater and a polymerization reactor. The ethylene feed is located upstream of the hyper-compressor. The antifoulant consists of an inhibitor (or a mixture of one or more inhibitors), molecular oxygen, and optionally a solvent; the antifoulant introduced into the ethylene feed upstream of the hyper-compressor. The process includes adding a free radical initiator to the polymerization reactor and polymerizing the ethylene in the polymerization reactor under high-pressure free-radical polymerization conditions. The process includes forming an ethylene-based polymer.

The process includes introducing an antifoulant into an ethylene feed of a polymerization reactor system. A "reactor system," as used herein, refers to the components and devices used to polymerize one or more olefin monomers. The reactor system includes a hyper-compressor, a pre-heater, and a polymerization reactor in fluid communication with each other. The polymerization reactor is one or more high pressure polymerization reactors. Nonlimiting examples of suitable high pressure polymerization reactors include an autoclave reactor, a tubular reactor, or a combination of an autoclave reactor in operative communication with a tubular reactor.

The reactor system includes an ethylene feed, a hyper-compressor, a preheater, and a polymerization reactor, each component in fluid communication with, or otherwise in operative communication with, each other. A "hyper-compressor," as used herein, is a compressor that pressurizes one or more ethylene feeds to a pressure of at least 100 MPa. The ethylene feed is located upstream of the hyper-compressor. Moving through the reactor system in an upstream to downstream direction, the reactor system includes (i) the ethylene feed in fluid communication with (ii) the hyper-compressor, the hyper-compressor in fluid communication with (iii) the preheater, and the preheater in fluid communication with (iv) the polymerization reactor. The pre-heater heats the polymerization reactor contents prior to injection of the free-radical initiator. The reactor system may include other components in addition to these components.

FIG. 1 shows an embodiment of a flow scheme for the present reactor system. Ethylene monomer is introduced into the reactor system as one or more ethylene feeds. The ethylene monomer may be (i) a feed (1) of fresh ethylene, (ii) a feed (18) of recycle ethylene, or (iii) a combination of (i) and (ii), namely, a combined ethylene feed (3) composed of both fresh ethylene feed (1) and recycle ethylene feed (18). Recycle ethylene feed (18) is ethylene monomer separated from the polymerization reaction mixture by way of a high pressure separator ("HPS" in FIG. 1). Any of the foregoing ethylene feeds may (or may not) include a trace amount of latent oxygen. It is understood the molecular oxygen is separate and distinct from any trace amount of oxygen present in the ethylene feed.

Ethylene feed (1), (18), and/or (3) feed ethylene monomer to a hyper-compressor ("Hyper Compressor" in FIG. 1). The hyper-compressor pressurizes the ethylene feed(s) to a level sufficient to feed the polymerization reactor ("Reactor" in FIG. 1) and produce high pressure free-radical polymerization conditions. The preheater ("Preheater" in FIG. 1) receives the output from the hyper-compressor and heats this output to a temperature for high pressure free radical polymerization, or a temperature from 130° C. to 170° C. The polymerization reactor receives the output from the preheater and increases the temperature from 250° C. to 360° C.; polymerization occurs in the polymerization reactor at a temperature from 250° C. to 360° C. The term "high pressure free-radical polymerization conditions," as used herein, refers to the environment in a polymerization reactor (autoclave reactor and/or tubular reactor) with (i) a pressure of at least 100 MPa (1000 Bar), (ii) a temperature from 150° C. to 360° C., and (iii) the presence of a free-radical initiator.

In an embodiment, the fresh ethylene feed (1) is compressed together with the outlet of a booster compressor ("Booster" in FIG. 1), by a primary compressor ("Primary" in FIG. 1) to produce ethylene feed (2). In a further embodiment, ethylene feed (2) is combined with recycle ethylene stream (18) to form combined ethylene feed (3), and distributed over the suction inlets of the hyper-compressor ("Hyper-compressor" in FIG. 1).

The process includes introducing an antifoulant into the ethylene feed of the reactor system. The antifoulant consists of (i) an inhibitor (or one or more inhibitors), (ii) molecular oxygen, and (iii) optionally a solvent (or one or more solvents). In other words, the antifoulant consists of only two components (inhibitor and molecular oxygen), or consists of only three components (inhibitor, molecular oxygen, and solvent). When no optional solvent is present, the antifoulant consists of two components, namely, the inhibitor (or one or more than one inhibitors) and molecular oxygen.

In an embodiment, the inhibitor and the molecular oxygen are the sole components of the antifoulant and are added to the ethylene feed. The inhibitor and the molecular oxygen each can be added separately to the ethylene, each can be added at the same location, or each can be added at different locations upstream of the hyper-compressor.

In an embodiment, the process includes introducing the antifoulant into the ethylene feed by introducing the molecular oxygen and the inhibitor simultaneously, or substantially simultaneously, into the ethylene stream at the same location. The process includes dispersing, or otherwise dissolving, the inhibitor and the molecular oxygen in the solvent. Nonlimiting examples of suitable inhibitors include phenothiazine, (2,2,6,6-tetramethylpiperidin-1-yl)oxyl (TEMPO), derivatives of TEMPO, monomethyl ether hydroquinone (MEHQ), butylated hydroxytoluene (BHT), Irganox 1010, Irganox 1076, Vitamin E, and combinations thereof.

The solvent system can be a single solvent or a mixture of two or more solvents. Nonlimiting examples of suitable solvent for the solvent system include aliphatic $C_3$-$C_6$ hydrocarbon (propane, butane, pentane, hexane), olefinic $C_3$-$C_6$ hydrocarbon (propylene, butene, pentene, hexene), $C_1$-$C_6$ ketone (acetone, methyl ethyl ketone), $C_1$-$C_6$ aldehyde, $C_1$-$C_6$ alcohol (methanol, ethanol, propanol, butanol, pentanol, hexanol), and combinations thereof.

In an embodiment, the process includes dispersing, or otherwise dissolving, the inhibitor and the molecular oxygen into the solvent prior to, or before, the introduction of the antifoulant into the ethylene feed. In a further embodiment, the process includes (prior to the introduction of the antifoulant into the ethylene feed) dispersing molecular oxygen and an inhibitor selected from phenothiazine (PTZ), (2,2,6,6-tetramethylpiperidin-1-yl)oxyl (TEMPO), a derivative of TEMPO, monomethyl ether hydroquinone (MEHQ), butylated hydroxytoluene (BHT), Irganox 1010, Irganox 1076, Vitamin E, and combinations thereof, into a solvent selected from aliphatic $C_3$-$C_6$ hydrocarbon, olefinic $C_3$-$C_6$ hydrocarbon, $C_1$-$C_6$ ketone, $C_1$-$C_6$ aldehyde, $C_1$-$C_6$ alcohol, and combinations thereof, and forming the antifoulant.

The antifoulant is introduced into one, some, or all of the following ethylene feeds: ethylene feed (1), and/or ethylene feed (2), and/or combined ethylene feed (3), and/or recycle ethylene feed (18).

Since the antifoulant is introduced into the ethylene feed (and the ethylene feed is located upstream of the hyper-compressor), the point at which antifoulant addition occurs is upstream of the hyper-compressor. Since the antifoulant is introduced upstream of the hyper-compressor (and the hyper-compressor is upstream of the preheater), the point at which the antifoulant addition occurs is upstream of the preheater. Since the antifoulant is introduced upstream of the preheater (and the preheater is upstream of the polymerization reactor), the point at which antifoulant addition occurs is upstream of the polymerization reactor.

In an embodiment, the process includes introducing the antifoulant into the fresh ethylene feed (1).

In an embodiment, the process includes introducing the antifoulant into the ethylene feed (2).

In an embodiment, the process includes introducing the antifoulant into the combined ethylene feed (3).

In an embodiment, the process includes introducing the antifoulant into the recycle ethylene feed (18).

In an embodiment, the reactor system includes one or more antifoulant inlets in fluid communication with the respective one or more ethylene feeds. The antifoulant inlet is in direct fluid communication with the ethylene feed. The term "direct fluid communication" refers to a configuration whereby a first structure (i.e., the antifoulant inlet) is in immediate fluid communication with a second structure (i.e., the ethylene feed) such that no intervening third structure is located between the first structure and the second structure. The process includes introducing the antifoulant into the antifoulant inlet and into the ethylene feed.

In an embodiment, the reactor system includes an antifoulant inlet 1a in direct fluid communication with ethylene feed (1), and/or an antifoulant inlet 2a in direct fluid communication with ethylene feed (2), and/or an antifoulant inlet 3a in direct fluid communication with combined ethylene feed (3), and/or an antifoulant inlet 18a in direct fluid communication with recycle ethylene feed (18).

In an embodiment, the antifoulant consists of only liquid inhibitor, molecular oxygen, and solvent, the antifoulant introduced into the antifoulant inlet (1a), and/or (2a), and/or (3a), and/or (18a).

Since the antifoulant inlet is located upstream of the hyper-compressor, the point at which the antifoulant inlet introduces antifoulant into the ethylene feed is upstream of the hyper-compressor, and the antifoulant inlet is also upstream of the preheater, and the antifoulant inlet is also upstream of the polymerization reactor.

In an embodiment, the process includes introducing the antifoulant into the antifoulant inlet (1a) and directly into fresh ethylene feed (1).

In an embodiment, the process includes introducing the antifoulant into the antifoulant inlet (2a) and directly into ethylene feed (2).

In an embodiment, the process includes introducing the antifoulant into the antifoulant inlet (3a) and directly into combined ethylene feed (3).

In an embodiment, the process includes introducing the antifoulant into the antifoulant inlet (18a) and directly into the recycle ethylene feed (18).

In an embodiment, the process includes introducing the antifoulant into the ethylene feed by introducing the molecular oxygen as a gas into the ethylene stream at a first location in the reactor system and separately introducing the inhibitor into the ethylene stream at a second location in the reactor system, the second location different than the first location. The first location and the second location each is upstream of the hyper-compressor. The process includes (i) introducing molecular oxygen gas at a first location selected from upstream of the Booster (at location 13 in FIG. 1) or upstream of Primary (at location 1 in FIG. 1) and (ii) separately introducing the inhibitor at a second location selected from fresh ethylene feed (1), antifoulant inlet (1a), ethylene feed (2), antifoulant inlet (2a), combined ethylene feed (3), antifoulant (3a), recycle ethylene feed (18), antifoulant inlet (18a), and any combination thereof.

In an embodiment, the process includes introducing the antifoulant into the ethylene feed by introducing the molecular oxygen as a gas into the ethylene stream at a first location in the reactor system and separately from the addition of the inhibitor into the ethylene stream at a second location in the reactor system. The process includes (i) introducing molecular oxygen gas at a first location upstream of the Booster (at location (13) in FIG. 1) and (ii) separately introducing the inhibitor at a second location selected from fresh ethylene feed (1), antifoulant inlet (1a), ethylene feed (2), antifoulant inlet (2a), combined ethylene feed (3), antifoulant (3a), recycle ethylene feed (18), antifoulant inlet (18a), and any combination thereof.

In an embodiment, one or more chain transfer agents (CTA) are fed to the hyper-compressor for introduction into the polymerization reactor to control molecular weight of the resultant ethylene-based polymer. Non-limiting examples of suitable CTAs include propylene, isobutane, n-butane, 1-butene, methyl ethyl ketone, acetone, ethyl acetate, propionaldehyde, ISOPAR (ExxonMobil Chemical Co.), isopropanol, and combinations thereof. The amount of CTA used in the process is from 0.01 weight percent to 10 weight percent, or from 0.01 weight percent to 5 weight percent, or from 0.1 weight percent to 1.0 weight percent, or from 0.1 weight percent to 0.5 weight percent, or from 0.01 weight percent to 0.1 weight percent of the total reaction mixture.

In an embodiment, the solvent for the antifoulant is the CTA for the high pressure free-radical polymerization. Consequently, the addition of the CTA occurs simultaneously with, or substantially simultaneously with, the introduction of the antifoulant into the ethylene feed. In a further embodiment, the present process includes introducing the CTA (as the solvent for the inhibitor, the CTA a component of the antifoulant) with the antifoulant into the ethylene feed, the introduction of the CTA occurring upstream of the hyper-compressor.

In an embodiment, the reaction system includes CTA stream (4) and/or recycle CTA stream (5). The CTA stream 4 and/or the CTA recycle stream (5) can, in principle, be freely distributed over the main compression streams fed and/or distributed over the side stream (8) and front stream (9). CTA stream (4) and/or CTA recycle stream (5) can be fed in the inlet(s), interstage(s), outlet(s) of the hyper-compressor and/or inlet(s) of the reaction zones in the polymerization reactor.

When the solvent for the antifoulant is the CTA, the CTA stream (4) and/or the recycle CTA stream (5) operate in conjunction with the antifoulant feed to provide the proper amount of CTA to the reaction system. When the solvent for the antifoulant is not the CTA, the CTA stream (4) and/or recycle CTA stream (5) are the sole sources of CTA for the reactor system.

In an embodiment, the reactor system includes a branching agent stream (6) and/or a polymerizable comonomer stream (7). The branching agent feed (6) and/or the polymerizable comonomer stream (7) can, in principle, be freely distributed over the main compression streams fed and/or distributed over the side stream (8) and/or front stream (9). Branching agent stream (6) and/or polymerizable comonomer stream (7) can be fed in the inlet(s), interstage(s), outlet(s) of the hyper-compressor, individual ethylene feed streams to the reactor or directly into the reaction zones.

The discharge temperature of the hyper-compressor is from 60° C. to 110° C. The preheater heats the ethylene feed (and other feeds) received from the hyper-compressor to a temperature from 130° C. to 170° C. After passing through the hyper-compressor and the preheater, the ethylene monomer with antifoulant flows into, or otherwise enters into, the polymerization reactor ("Reactor" in FIG. 1). The process includes adding a free radical initiator to the polymerization reactor and polymerizing the ethylene in the polymerization reactor under high pressure free-radical polymerization conditions to form an ethylene-based polymer.

The free radical initiator is added directly to one or more reaction zones of the polymerization reactor. Alternatively, the free radical initiator is introduced into the polymerization reactor by way of side stream (8). Nonlimiting examples of suitable free radical initiator include organic peroxides, cyclic peroxides, diacyl peroxides, dialkyl peroxides, hydroperoxides, peroxycarbonates, peroxydicarbonates, peroxyesters, peroxyketals, t-butyl peroxy pivalate, di-t-butyl peroxide, t-butyl peroxy acetate and t-butyl peroxy-2-hexanoate, and combinations thereof. In an embodiment, the free radical initiator includes at least one peroxide group incorporated in a ring structure. Non-limiting examples of free radical initiators with a peroxide group incorporated in a ring structure include TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. The organic peroxy initiators are used in an amount from 0.001 wt % to 0.2 wt %, based upon the weight of polymerizable monomers.

In an embodiment, the high pressure free-radical polymerization occurs in a tubular reactor having multiple reactor zones (from three to six reactor zones). The maximum temperature in each reactor zone is from 150° C. to 360° C., or from 170° C. to 350° C., or from 200° C. to 340° C. The pressure in each reactor zone is from 100 MPa to 380 MPa, or from 110 MPa to 340 MPa, or from 110 MPa to 300 MPa.

"Pre-polymerization," (or "pre-polymer") as used herein, is the premature polymerization of the ethylene (and optional branching agent and/or optional polymerizable comonomer) in the hyper-compressor and/or in the preheater. The pre-polymer formed in the hyper-compressor (also in the interstage cooler), and in the preheater is high-density (0.930-0.965 g/cc) high molecular weight (150, 000-500,000 g/mol) polymer which phase separates and forms a solid deposit, thus interfering with operation of the hyper-compressor and reducing the heat transfer in interstage cooler(s) and in the preheater. In an embodiment, the process includes reducing, or otherwise preventing, with the antifoulant, pre-polymerization (or pre-polymer composed of the ethylene and/or optional branching agent and/or optional polymerizable comonomer) in the hyper-compressor and/or in the preheater.

Applicant developed a fouling rating scale with a rating of "1" being highly fouled (comparative example 1 having a "1" rating of highly fouled as shown in FIG. 3), a rating of "4" being very clean (inventive example 1 having a rating of "4" being very clean as shown in FIG. 7), and a rating of "5" being completely clean. In an embodiment, the process includes introducing the antifoulant into the ethylene feed to form an ethylene feed containing from 0.01 mol ppm to 5 mol ppm inhibitor and from 0.05 ppm to 3 ppm molecular oxygen, or from 0.05 mol ppm to 3 mol ppm inhibitor and from 0.1 ppm to 1.0 ppm molecular oxygen, or from 0.07 mol ppm to 2 mol ppm inhibitor and from 0.2 ppm to 0.5 ppm molecular oxygen, or from 0.1 mol ppm to 1.0 mol ppm inhibitor and from 0.2 ppm to 0.5 ppm molecular oxygen; the process further including reducing, or otherwise preventing ("preventing" being fouling rating 4-5, or 5), pre-polymerization (or formation of pre-polymer) in the hyper-compressor and/or in the preheater. Although the inhibitor or molecular oxygen each individually can act as an antifoulant, Applicant discovered that the combination of the inhibitor and molecular oxygen together results in an antifoulant with greater ability to reduce/prevent pre-polymer formation compared to the inhibitor alone or molecular oxygen alone. This inhibitor/molecular oxygen combination enables the use of lower levels for inhibitor and oxygen, each of which can lead to reactor instabilities at higher concentrations.

In an embodiment, the process includes adding a polymerizable comonomer to the polymerization reactor by way of polymerizable comonomer stream (7) and forming an ethylene copolymer. Nonlimiting examples of suitable polymerizable comonomers include one or more $C_3$-$C_{20}$ α-olefin comonomers, acrylate, (meth)acrylic acid, (meth)acrylic ester, carbon monoxide, maleic anhydride, vinyl acetate, vinyl propionate, mono esters of maleic acid, diesters of maleic acid, vinyl trialkoxysilane, vinyl trialkyl silane, and any combination thereof. Nonlimiting examples of suitable $C_3$-$C_{20}$ α-olefin comonomers include one or more linear or branched $C_3$-$C_{12}$ α-olefin comonomers, or one or more linear or branched $C_4$-$C_8$ α-olefin comonomers such as propylene, 1-butene, 1 pentene, 4-methyl-1-pentene, 1-hexene, and 1-octene.

In an embodiment, the antifoulant is void of, or otherwise excludes, a polymerizable comonomer.

After finishing the reaction (and referring to FIG. 1), and having applied multiple cooling steps, the reaction mixture is depressurized and/or cooled in (10), and separated in the high pressure separator (HPS). The high pressure separator separates the reaction mixture into an ethylene rich stream (15), containing minor amounts of waxes and/or entrained polymer, and a polymer rich stream (11), which is sent for further separation to the low pressure separator (LPS). Ethylene stream (15) is cooled down and cleaned in stream (17). Stream (16) is a purge stream to remove impurities and/or inerts. The ethylene-based polymer separated in the LPS is further processed in (12). The ethylene removed in the LPS is fed to the booster compressor ("Booster" in FIG. 1), where during the compression condensables, like solvent, lubrication oil and other liquids, are collected and removed through stream (14). The outlet of the booster compressor ("Booster" in FIG. 1) is combined with the fresh ethylene feed (1), and further compressed by the primary compressor ("Primary" in FIG. 1).

The reactor system includes a lubricant feed for the hyper-compressor. The lubricant oil may (or may not) contain an antioxidant. Some lubricant may leak into the compression chamber of the hyper-compressor and thus leak into the ethylene. The present process advantageously adds antifoulant directly into the ethylene feed upstream of the hyper-compressor, avoiding the need to dissolve antifoulant in the lubricant oil. In an embodiment, the antifoulant upon addition to the ethylene feed, is void of, or otherwise excludes, lubricant oil.

By way of example, and not limitation, some embodiments of the present disclosure will now be described in detail in the following Examples.

EXAMPLES

Process Used for Inventive Examples and Comparative Samples

FIG. 2 shows a schematic representation of the equipment used to prepare the comparative examples and the inventive example. A 300 ml continuous polymerization reactor (CPR) is used to replicate the hyper-compressor and the preheater portions of an industrial-scale LDPE production system. To the CPR, ethylene monomer is added at 7 lb/hr. To this ethylene stream and upstream of the hyper-compressor is added propionaldehyde (serving as both a chain transfer agent and the antifoulant solvent) at 1000 mol ppm to the ethylene. The ethylene and propionaldehyde are then pressurized in the hyper-compressor to 30,000 psi (206,800 kiloPascals (kPa)) through the use of a valve. The CPR is heated to 140° C. to replicate the temperatures in the hyper-compressor and in the preheater portion of an industrial-scale LDPE production system. The ethylene and propionaldehyde are allowed to flow through the CPR reactor at 140° C. for 18 hours to further replicate the hyper-compressor and the preheater portions of an industrial-scale LDPE production system. During the course of the 18 hours all pre-polymer formed is collected and weighed. At the end of the 18 hours the CPR is opened and examined for the level of fouling (hereafter referred to as Process1).

Comparative Samples

In the comparative examples 1-4 (CE1-4), Process1 is performed with varying amounts of molecular oxygen (CE1 0 ppm, CE2 1 ppm, CE3 5 ppm, CE4 0 ppm) added to the solvent (propionaldehyde). In CE4, 0.5 ppm MEHQ is dissolved in the propionaldehyde, with no molecular oxygen added in CS4.

Inventive Example

In the inventive example (IE1), Process1 is performed with 0.5 ppm molecular oxygen dissolved in Isopar-E solvent and 0.5 ppm MEHQ dissolved in propionaldehyde as the three-component antifoulant. The antifoulant is added simultaneously with the ethylene monomer to the reactor system. Process1 is performed five separate times, a run for each of CS1-4 and IE1.

The amount of prepolymer collected during the course of the 18 hours is measured for each run. Then after opening the reactor the level of fouling in the Comparative Examples and in the Inventive Example is rated on a scale from 1 to 5, with 1 being highly fouled and 5 being completely clean. The results are shown in Table 1 below.

TABLE 1

| Run # | Molecular O$_2$ level (mol ppm) | MEHQ level (mol ppm) | Polymer collected (lb) | Fouling (1-5) |
|---|---|---|---|---|
| CE1 | 0 | 0 | 0.55 | 1 |
| CE2 | 1 | 0 | 1.2 | 2 |
| CE3 | 5 | 0 | 2.14 | 4 |
| CE4 | 0 | 0.5 | 0.62 | 2 |
| IE1 | 0.5 | 0.5 | 0.33 | 4 |

CE = comparative example
IE = inventive example

As can be seen in Table 1 and exhibited in FIGS. 3-7, the direct addition of antifoulant (inhibitor, molecular oxygen, and solvent) with the ethylene monomer to the reaction system, acts to reduce, or eliminate/prevent altogether, the amount of prepolymer produced at the operating conditions for the hyper-compressor and preheater. The combination of inhibitor and molecular oxygen acts synergistically to reduce the amount of pre-polymer that forms at temperatures and pressures that are below reaction conditions—i.e., at the operating conditions of the hyper-compressor and/or the preheater. IE1 yields almost no fouling and no pre-polymer build-up on component surfaces and leads to less polymer formation over the course of the experiment than any of the comparative examples. Applicant discovered molecular oxygen combined with inhibitor works synergistically as effective antifoulant, enabling a reduction in molecular oxygen (from 0.1 ppm to less than 1.0 ppm or from 0.1 ppm to 0.5 ppm molecular oxygen) and a reduction in inhibitor (from 0.1 ppm to less than 1.0 ppm or from 0.1 ppm to 0.5 ppm inhibitor) while still achieving little, or no, pre-polymer build-up. A reduction in molecular oxygen is advantageous because oxygen is known to cause reactor instability at higher concentrations.

IE1 (0.5 ppm O$_2$/0.5 ppm MEHQ) compared to CE2 (1.0 ppm O$_2$/0 ppm MEHQ) shows the synergistic effect of the O$_2$/inhibitor combination with IE1 exhibiting 0.33 lb prepolymer build-up compared to ~4× more prepolymer build-up in CE2 (O$_2$ only) at 1.2 lb.

IE1 (0.5 ppm O$_2$/0.5 ppm MEHQ) compared to CE4 (0 ppm O$_2$/1.0 ppm MEHQ) shows the synergistic effect of the O$_2$/inhibitor combination with IE1 exhibiting 0.33 lb prepolymer build-up compared to ~2× more prepolymer build-up in CE4 (inhibitor only) at 0.62 lb.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
    introducing an antifoulant into an ethylene feed of a reactor system, the reactor system comprising the ethylene feed, a hyper-compressor, a preheater and a polymerization reactor, the ethylene feed located upstream of the hyper-compressor, the antifoulant consisting of an inhibitor, molecular oxygen, and an optional solvent;
    adding a free radical initiator to the polymerization reactor;
    polymerizing the ethylene in the polymerization reactor under high pressure free-radical polymerization conditions; and
    forming an ethylene-based polymer.

2. The process of claim 1 comprising
    preventing, with the antifoulant, pre-polymerization of the ethylene in a component selected from the group consisting of the hyper-compressor, the preheater, and combinations thereof.

3. The process of claim 1 comprising dispersing, before the introducing, the inhibitor and the molecular oxygen into the solvent, the inhibitor selected from the group consisting of phenothiazine, (2,2,6,6-tetramethylpiperidin-1-yl)oxyl (TEMPO) or a derivative thereof, monomethyl ether hydroquinone (MEHQ), butylated hydroxytoluene (BHT) and combinations thereof, and
    the solvent selected from the group consisting of aliphatic C$_3$-C$_6$ hydrocarbon, olefinic C$_3$-C$_6$ hydrocarbon, C$_1$-C$_6$ ketone, C$_1$-C$_6$ aldehyde, C$_1$-C$_6$ alcohol, and combinations thereof.

4. The process of claim 1 comprising adding a polymerizable comonomer to the polymerization reactor; and
    forming an ethylene copolymer.

5. The process of claim 1, comprising introducing an antifoulant consisting of from 0.01 mol ppm to less than 1.0 ppm inhibitor, from 0.01 mol ppm to less than 1.0 ppm molecular oxygen, and optional solvent into the ethylene feed; and
    preventing formation of a pre-polymer in a component selected from the group consisting of the hyper-compressor, the preheater, and combinations thereof.

6. The process of claim 1 comprising introducing an antifoulant consisting of from 0.01 mol ppm to less than 1.0 ppm monomethyl ether hydroquinone (MEHQ), from 0.01 mol ppm to less than 1.0 ppm molecular oxygen, and optional solvent into the ethylene feed; and
    preventing formation of a pre-polymer in a component selected from the group consisting of the hyper-compressor, the preheater, and combinations thereof.

* * * * *